United States Patent
Ezzat et al.

(10) Patent No.: US 6,273,486 B1
(45) Date of Patent: Aug. 14, 2001

(54) INTEGRATED TUNABLE FRONT CRASH SUPPORT STRUCTURE

(75) Inventors: Hesham A. Ezzat, Troy; David A. Dolenga, Sterling Heights, both of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/528,020

(22) Filed: Mar. 17, 2000

(51) Int. Cl.$^7$ .................................................. B62D 27/00
(52) U.S. Cl. ...................... 296/29; 296/194; 296/203.01; 296/203.02
(58) Field of Search .............................. 296/29, 30, 194, 296/203.01, 203.02, 203.03

(56) References Cited

U.S. PATENT DOCUMENTS 4,673,205 * 6/1987 Drewk .................................. 296/194
5,125,715 * 6/1992 Kijima .............................. 296/194 X
5,806,918 * 9/1998 Kanazawa .......................... 296/30 X

FOREIGN PATENT DOCUMENTS

| 0421277 | * | 4/1991 | (EP) | ..................................... 296/194 |
| 0182177 | * | 7/1989 | (JP) | ..................................... 296/194 |
| 404046875 A | * | 2/1992 | (JP) | ........................................ 296/29 |

* cited by examiner

Primary Examiner—D. Glenn Dayoan
Assistant Examiner—Lori L. Coletta
(74) Attorney, Agent, or Firm—Anthony Luke Simon

(57) ABSTRACT

A torque box for use in a vehicle having a front rail and rocker is comprised of a single casting. The torque box includes a first projection shaped to connect to the front rail, a second projection shaped to connect to the rocker, and a connector connecting the first projection to the second projection.

4 Claims, 2 Drawing Sheets

INTEGRATED TUNABLE FRONT CRASH SUPPORT STRUCTURE

FIELD OF THE INVENTION

This invention is generally related to a support structure within a vehicle body. More particularly, the invention relates to a torque box within a vehicle body structure that connects the front or rear frame rails to the side rockers, thus forming the lower frame of the structure to provide a transition that directs forces during energy-absorbing events from the front or rear rails to the rocker. The torque box must have adequate strength to allow the front or rear rails to deform progressively and absorb energy, and must also have adequate stiffness to distribute the loads to the rest of the underbody structure.

BACKGROUND OF THE INVENTION

Two important elements of the frame of a vehicle are the front rails and the rockers. The front rails provide support for components such as the engine and are the main energy-absorbing deformable members. Because of the wheels, the front rails are set somewhat close to the centerline of the vehicle. The rockers support the mid-section of the frame and are placed farther from the centerline of the vehicle than the front rails to maximize the interior occupant space. The rockers are also placed lower than the rails from a side-view perspective.

One way of distributing load to the underbody of a vehicle is to use underbody rails. These have the disadvantage of adding height to the vehicle on which they are used, and they require substantial length. A well-known alternative practice is to connect the front and rear rails to the rocker with torque boxes. The torque box rigidly connects the rail and the rocker and provides the mechanism to transfer longitudinal deforming force from the rails to the rocker.

It has been general practice to form a torque box from sheet metal that is stamped and welded or otherwise joined together. But this usual construction of a torque box from sheet metal requires more than one piece, resulting in multiple forming tools and complicating the assembly process. And the need to tune a torque box to withstand the initial peak impact force while still distributing such a force to the rocker may be a cumbersome process. It may also be difficult to vary the thickness to tune the conventional torque box that is made of stamped sheet metal, because stampings are typically of constant gage. In addition, adding ribs or gussets would require additional parts.

It would be desirable to have a support structure that would overcome the above problems.

SUMMARY OF THE INVENTION

The disadvantages recited above are overcome by making a torque box of a single-piece large thin-wall casting. This provides the advantage of a relatively low-cost torque box that is stronger and more easily changed in shape than a spot-welded sheet-metal torque box. A cast torque box can be tuned by varying the thickness of the part in various regions or by adding or removing ribs or gussets. It may be desired to change the shape or configuration of the torque box both to tune the part to meet specifications during vehicle development and also to incorporate features such as brackets and other chassis interfaces. When the rails and the rockers are parallel to each other, as they often are, such a casting can be designed using a single-pull die, making it unnecessary to use die inserts or sleeves. The result is a torque box that is both cheaper to make and easier to assemble, making for more cost savings in production.

The invention provides the foregoing and other features, and advantages of the invention will become further apparent from the following detailed description of the presently preferred embodiments, read in conjunction with the accompanying drawings. The detailed description and drawings are merely descriptive, and do not limit the scope of the invention, which is defined by the appended claims and equivalents thereof.

DETAILED DESCRIPTION OF THE PRESENTLY PREFERRED EMBODIMENTS

Figure 1:
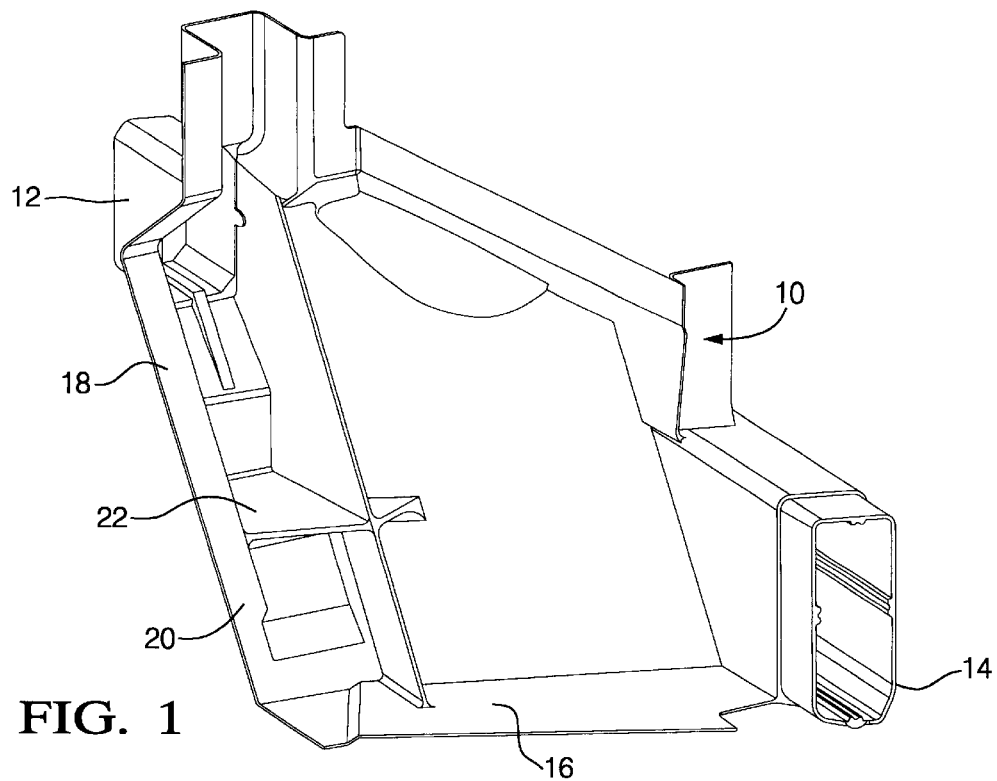
FIG. 1 is a perspective view of one embodiment of a torque box in accordance with the present invention.
Figure 2:
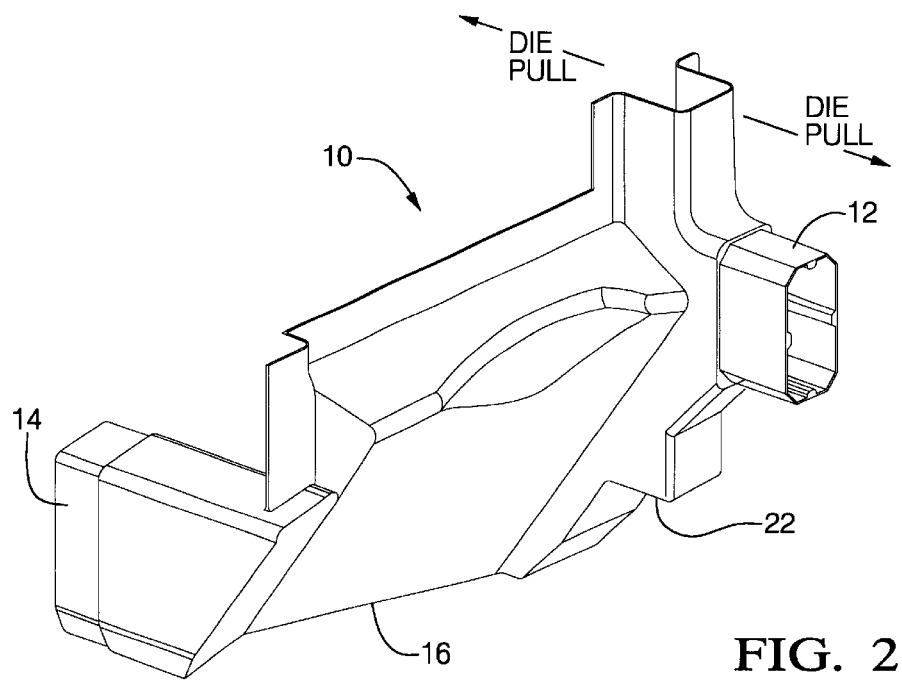
FIG. 2 is a perspective view of the torque box of FIG. 1 from the reverse direction.
Figure 3:
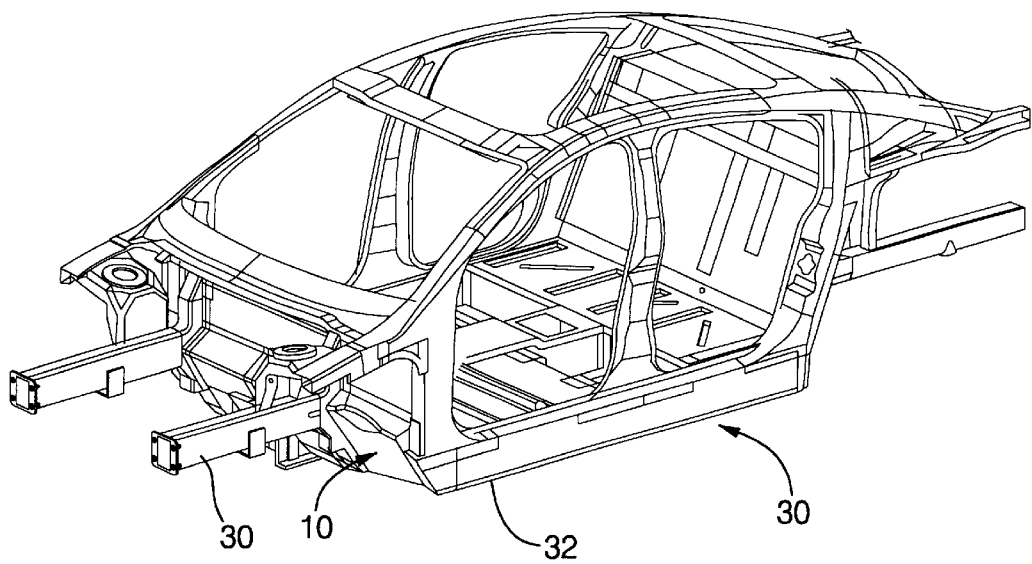
FIG. 3 is a perspective view of a portion of the frame of a vehicle showing the torque box of FIG. 1 in place.

Referring to FIG. 1, one embodiment of a torque box in accordance with the present invention is generally shown at numeral 10. Referring to FIGS. 1, 2, and 3, a projection 12 is adapted to connect to a front rail 30 of a vehicle frame 32. A projection 14 is adapted to connect to a rocker 34 that is parallel to but not in line with the front rail 30. A connector 16 is angled to connect the projections 12 and 14. While the torque box 10 is indicated here as a front torque box, it may also be a rear torque box and the rail could be a rear rail. The invention is also adaptable either to a body-frame-integral construction or a space-frame construction.

The torque box 10 is preferably a single thin-wall casting, which is capable of having high material strength. As a casting, the torque box 10 may readily be designed with different wall thickness in different regions, aiding the process of tuning the torque box 10. The term "tuning" is defined as shaping the torque box 10 to have desired properties of strength to transmit the forces not absorbed by the front rail 30 from the front rail 30 to the rocker 34. Part of the tuning process involves stiffening ribs 18 and gussets 20. It would be easy to add more ribs or gussets according to results of performance tests or to adapt the design to a smaller or larger vehicle.

It is evident from an inspection of FIGS. 1 and 2 that the torque box 10 of FIGS. 1 and 2 can be cast with a straight die pull and would not require sleeves or inserts. This is a significant advantage in manufacturing the torque box 10 that would reduce manufacturing costs. The torque box 10 may be made of any material that can be cast, including especially aluminum or metal matrix composites. In addition to the attachments to the rails and the rocker, the torque box 10 also provides a chassis sub-frame attachment 22 and other attachments to elements such as the dash panel, the hinge pillar.

Figure 4:
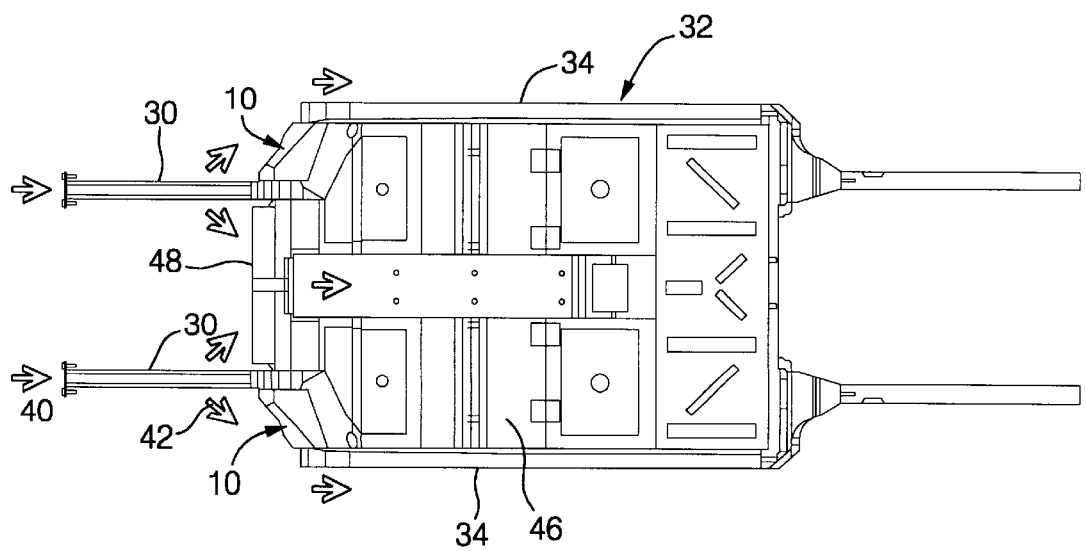
FIG. 4 is a top view of a portion of the frame of a vehicle showing the distribution of forces imparted from the front end.

FIG. 4 is a top view of a portion of the frame 32 of a vehicle showing the distribution of forces that may be imparted from the front end. In FIG. 4, an arrow 40 represents the direction of force applied to the front rail 30. The rail 30 deforms as it absorbs some or all of the force, and it transmits the force to the torque box 10, which in turn couples the force as shown by an arrow 42 to the rocker 34.

This combination directs much of the force away from the passenger compartment 46. The torque box 10 may be designed to accommodate a number of automotive body structure design preferences such as a cross-bar member 413 of FIGS. 3 and 4 and a chassis sub-frame attachment 22 as in FIGS. 1 and 2.

While the embodiments of the invention disclosed herein are presently considered to be preferred, various changes can be made without departing from the spirit and scope of the invention. The scope of the invention is defined by the appended claims, and all changes that come within the meaning and range of equivalents are intended to be embraced therein.

We claim:

1. A torque box for use in a vehicle having a front rail and a rocker, the torque box comprising a single casting having a first projection on a forward end of the torque box in a longitudinal direction of the vehicle shaped to connect in the longitudinal direction of the vehicle to the front rail, a second projection on a rear end of the torque box in the longitudinal direction of the vehicle shaped to connect in the longitudinal direction of the vehicle to the rocker, a connector connecting the first projection to the second projection, and a rib connected to the connector.

2. The torque box of claim 1 comprising in addition a plurality of ribs connected to the connector.

3. A torque box for use in a vehicle having a front rail and a rocker, the torque box comprising a single casting having a first projection on a forward end of the torque box in a longitudinal direction of the vehicle shaped to connect in the longitudinal direction of the vehicle to the front rail, a second projection on a rear end of the torque box in the longitudinal direction of the vehicle shaped to connect in the longitudinal direction of the vehicle to the rocker, a connector connecting the first projection to the second projection, and a gusset connected to the connector.

4. A torque box for use in a vehicle having a front rail and a rocker, the torque box comprising a single casting having a first projection on a forward end of the torque box in a longitudinal direction of the vehicle shaped to connect in the longitudinal direction of the vehicle to the front rail, a second projection on a rear end of the torque box in the longitudinal direction of the vehicle shaped to connect in the longitudinal direction of the vehicle to the rocker, a connector connecting the first projection to the second projection, and a plurality of gussets connected to the connector.

\* \* \* \* \*